(12) United States Patent
Connelly et al.

(10) Patent No.: US 11,100,703 B2
(45) Date of Patent: *Aug. 24, 2021

(54) DYNAMIC FRONTEND-DRIVEN GENERATION OF AN HLOD TREE

(71) Applicant: Bentley Systems, Incorporated, Exton, PA (US)

(72) Inventors: Paul Connelly, Coatesville, PA (US); Raymond B. Bentley, Elverson, PA (US)

(73) Assignee: Bentley Systems, Incorporated, Exton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/599,950

(22) Filed: Oct. 11, 2019

(65) Prior Publication Data
US 2020/0118330 A1    Apr. 16, 2020

Related U.S. Application Data

(60) Provisional application No. 62/745,374, filed on Oct. 14, 2018.

(51) Int. Cl.
*G06T 17/00* (2006.01)
*G06F 30/13* (2020.01)

(52) U.S. Cl.
CPC ............ *G06T 17/005* (2013.01); *G06F 30/13* (2020.01)

(58) Field of Classification Search
None
See application file for complete search history.

(56) References Cited

U.S. PATENT DOCUMENTS

| 6,326,964 B1 | 12/2001 | Snyder et al. |
| 6,348,921 B1 | 2/2002 | Zhao et al. |
| 6,897,858 B1 | 5/2005 | Hashimoto et al. |
| 7,283,135 B1 | 10/2007 | Coté et al. |

(Continued)

OTHER PUBLICATIONS

Bentley et al., U.S. Appl. No. 16/559,057 for "Techniques for Decoupling Access To Infrastructure Models", filed Sep. 3, 2019, 26 pages.

(Continued)

*Primary Examiner* — Steven Z Elbinger
(74) *Attorney, Agent, or Firm* — Cesari and McKenna, LLP; James A. Blanchette

(57) ABSTRACT

In example embodiments, techniques are provided for frontend-driven, incremental HLOD sub-tree creation and dynamic generation of tiles. An infrastructure modeling frontend module (e.g., a iModel.js Frontend module) of a frontend application may incrementally create a local HLOD sub-tree, beginning with an initial HLOD sub-tree based on initial metadata provided without tile contents, and refined based on metadata provided with tile contents, from an infrastructure modeling backend module (e.g., a iModel.js Backend module) of a backend application. The local HLOD sub-tree of each infrastructure modeling frontend module may differ based on the individual tiles requested and the tile refinement strategies employed. The infrastructure modeling backend module may not maintain an HLOD tree, and simply generates tiles upon request, serving them and storing them in a tile cache incase they are needed again.

18 Claims, 14 Drawing Sheets

(56) References Cited

U.S. PATENT DOCUMENTS

| | | | |
|---|---|---|---|
| 7,519,603 | B2 | 4/2009 | Parker |
| 9,865,085 | B1 | 1/2018 | Eng et al. |
| 2008/0270529 | A1* | 10/2008 | Cavagna ............... G06T 17/005 709/203 |
| 2013/0016108 | A1* | 1/2013 | Isozu ....................... G06T 1/60 345/501 |
| 2013/0325903 | A1 | 12/2013 | Rohlf et al. |
| 2014/0274154 | A1* | 9/2014 | Rana ................... G06F 16/2386 455/456.3 |
| 2015/0358633 | A1* | 12/2015 | Choi ...................... H04N 19/46 375/240.25 |
| 2015/0363969 | A1 | 12/2015 | Yang |
| 2016/0239660 | A1 | 8/2016 | Azvine et al. |
| 2017/0309027 | A1* | 10/2017 | Kleen .................. G06T 15/005 |
| 2017/0315696 | A1 | 11/2017 | Jacobson et al. |
| 2017/0372509 | A1 | 12/2017 | Paltashev et al. |
| 2019/0108245 | A1 | 4/2019 | Bentley et al. |
| 2019/0163349 | A1* | 5/2019 | Derner .................... G06F 3/005 |
| 2020/0058169 | A1* | 2/2020 | Friesenhahn ......... G06T 19/006 |

OTHER PUBLICATIONS

Bentley et al., U.S. Appl. No. 16/598,593 for "Efficient Refinement of Tiles of a HLOD Tree", filed Oct. 10, 2019, 35 pages.

Cozzi, Patrick, "Cesium 3D Tiles", Aug. 19, 2015, 14 pages.

Cozzi et al, "3D Tiles Specification 1.0", Cesium and Open Geospatial Consortium, Jun. 5, 2018, 127 pages.

Erikson et al, "HLODs for Faster Display of Large Static and Dynamic Environments", Department of Computer Science, University of North Carolina at Chapel Hill, Mar. 1, 2001, 11 pages.

"Notification of Transmittal of the International Search Report and the Written Opinion of the International Searching Authority, or the Declaration," International Filing date: Oct. 10, 2019, International Application No. PCT/US2019/055512, Applicant: Bentley Systems, Incorporated, dated Feb. 7, 2020, pp. 1-14.

Westerteiger, Rolf, et al., "Remote GPU-Accelerated Online Preprocessing of Raster Maps for Terrain Rendering," Virtuelle und Erweiterte Realitaet -9, Workshop der GI-Fachgruppe VR/AR 2012, Duesseldorf, Germany, 2012, pp. 1-12.

Bhatia et al. "gITF Specification", KhronosGroup, Jun. 9, 2017, 79 pages.

Erikson, Carl, et al., "HLODs for Faster Display of Large Static and Dynamic Environments," ACM, Proceedings of the 2001 Symposium on Interactive 3D Graphics, I3D'2001, Research Triangle Park, NC, USA, Mar. 1, 2001, pp. 111-121.

Martin, Ioana M., "Adaptive Rendering of 3D Models Over Networks Using Multiple Modalities," IBM Research Division, IBM Research Report, Computer Science/Mathematics, RC 21722 (Log 97821), Apr. 11, 2000, pp. 1-11.

"Notification of Transmittal of the International Search Report and the Written Opinion of the International Searching Authority, or the Declaration," International Filing Date: Oct. 10, 2019, International Application No. PCT/US2019/055569, Applicant: Bentley Systems, Incorporated, dated Dec. 17, 2019, pp. 1-16.

Park, Jong-Seung, et al., "Hierarchical Contribution Culling for Fast Rendering of Complex Scenes," Springer-Verlag Berlin Heidelberg, Advances in Image and Video Technology. PSIVT, Dec. 2006. Lecture Notes in Computer Science, vol. 4319, 2006, pp. 1324-1333.

Rischbeck, Thomas, et al., "A Scalable, Multi-User VRML Server," IEEE, IEEE Computer Society, Proceedings of the IEEE Virtual Reality 2002 (VR'02), Los Alamitos, California, Mar. 24-28, 2002, pp. 199-206.

Schneider, Bengt-Olaf, et al., "An Adaptive Framework for 3D Graphics Over Networks," Elsevier Science, Ltd., Pergamon, Computers & Graphics, IMC'98, vol. 23, No. 6, Dec. 1999, pp. 867-874.

Teler, Eyal, et al., "Streaming of Complex 3D Scenes for Remote Walkthroughs," Blackwell Publishers, The Eurographics Association and Blackwell Publishers, Eurographics 2001, vol. 20, No. 3, Sep. 4, 2001, pp. 1-9.

Schilling, Arne, "Using gITF for Streaming CityGML 3D City Models," ACM, Web3D '16: Proceedings of the 21st International Conference on Web3D Technology, Anaheim, California, USA, Jul. 22-24, 2016, pp. 109-116.

\* cited by examiner

HEADER 462
- FORMAT ID 464
- FORMAT VERSION 466
- VOLUME 468
- CHORD TOLERANCE 470
- NUMBER OF ELEMENTS INCLUDED 472
- NUMBER OF ELEMENTS EXCLUDED 474
- FLAGS (CURVED GEOMETRY, SOME GEOMETRY) 476
- LENGTH 478

FEATURE TABLE 480

SCENE 482

DATA STORE 484

DYNAMIC FRONTEND-DRIVEN GENERATION OF AN HLOD TREE

RELATED APPLICATIONS

Priority is claimed to previously filed U.S. Provisional Patent Application No. 62/745,374 filed on Oct. 14, 2018 for DYNAMIC FRONTEND-DRIVEN GENERATION OF AN HLOD TREE by Connelly et al., the contents of which are incorporated herein by reference in their entirety.

BACKGROUND

Technical Field

The present disclosure relates generally to infrastructure modeling, and more specifically to the display of views of infrastructure models utilizing tiles.

Background Information

Throughout the design, construction and operation of infrastructure (e.g., buildings, factories, roads, railways, bridges, electrical and communications networks, etc.) it is often desirable to model the infrastructure using infrastructure modeling applications. Infrastructure modeling applications traditionally have used a variety of different technologies and data formats to maintain infrastructure descriptions for different phases of the project. In the past, infrastructure models maintained according to such formats have been disjointed, and have included substantial data redundancies and other sources of inefficiency. The models may have been optimized and adapted for particular use cases, without much regard for other phases of the infrastructure project, leading to distinct product/discipline/phase data silos.

More recently, systems have been developed that can break down such existing product/disciple/phase data silos and enable the generation of a true "digital twin" of real-world infrastructure that describes aspects of infrastructure in a unified manner. Generation of this sort of "digital twin" has addressed many of the limitations of traditional infrastructure modeling techniques. However, it has also lead to technical challenges.

One of these challenges involves how to efficiently display a view of an infrastructure model on a client device. Since client devices may lack processing and storage capabilities for generating views themselves, they may instead rely upon cloud computing devices to "publish" the model. In traditional model "publishing," the cloud computing devices may analyze the infrastructure model to create a single, exhaustive HLOD tree that defines spaces (e.g., areas or volumes) and levels-of-detail (LODs) thereof. The cloud computing device may then generate a set of all possible tiles (e.g., two-dimensional (2D) or three-dimension (3D) tiles) that represent portions of the infrastructure model at different LODs. When needed, tiles may be served from the tile cache to client devices, which simply display the supplied tiles.

While addressing some issues, traditional publishing techniques suffer a number of shortcomings. For example, analyzing the entire infrastructure model to create a single, exhaustive HLOD tree, and producing a set of all possible tiles defined by the HLOD tree may require significant processing resources (i.e. processor cycles) of the cloud computing devices. Further, storing all possible tiles may consume significant storage resources (i.e. drive space). Sometimes this processing and storage resource consumption is wasted. For example, some portions of the HLOD tree and tiles corresponding thereto may not ever actually be used by any client device. While theoretically a client device could request the display of a particular tile that shows a particular portion of the infrastructure model at a particular LOD, one may never actually do so. Likewise, the infrastructure model may be modified before a request to display some tiles. In such case, a new single, exhaustive HLOD tree may be created, and a new set of all possible tiles produced. The existing unutilized tiles may simply be discarded.

In addition to this sort of inefficient utilization of processing and storage resources, traditional publishing techniques also may impose functional limitations on the views that may be displayed on client devices. For example, since a single, exhaustive HLOD tree is produced, a maximum LOD may be imposed to provide a termination point. However, users of some client devices may desire to zoom in on an infrastructure model to an arbitrary LOD, beyond any imposed maximum.

Accordingly, there is a need for improved techniques for displaying an infrastructure model utilizing an HLOD tree and tiles.

SUMMARY

Techniques are provided for frontend-driven, incremental HLOD sub-tree creation and dynamic generation of tiles. An infrastructure modeling frontend module (e.g., a iModel.js Frontend module) of a frontend application may incrementally create a local HLOD sub-tree, beginning with an initial HLOD sub-tree based on initial metadata provided without tile contents, and refined based on metadata provided with tile contents, from an infrastructure modeling backend module (e.g., a iModel.js Backend module) of a backend application. The local HLOD sub-tree of each infrastructure modeling frontend module may differ based on the individual tiles requested and the tile refinement strategies employed. The infrastructure modeling backend module may not maintain an HLOD tree, and simply generates tiles upon request, serving them and storing them in a tile cache incase they are needed again. Because tiles are generated upon request, no unused tiles are stored, conserving processing and storage resources. Further, since tiles are generated upon request, no artificial maximum LOD needs to be imposed.

It should be understood that a variety of additional features and alternative embodiments may be implemented other than those discussed in this Summary. This Summary is intended simply as a brief introduction to the reader, and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings of example embodiments, of which:

FIG. 4B is an example format for encoding tile contents;

DETAILED DESCRIPTION

Figure 1:
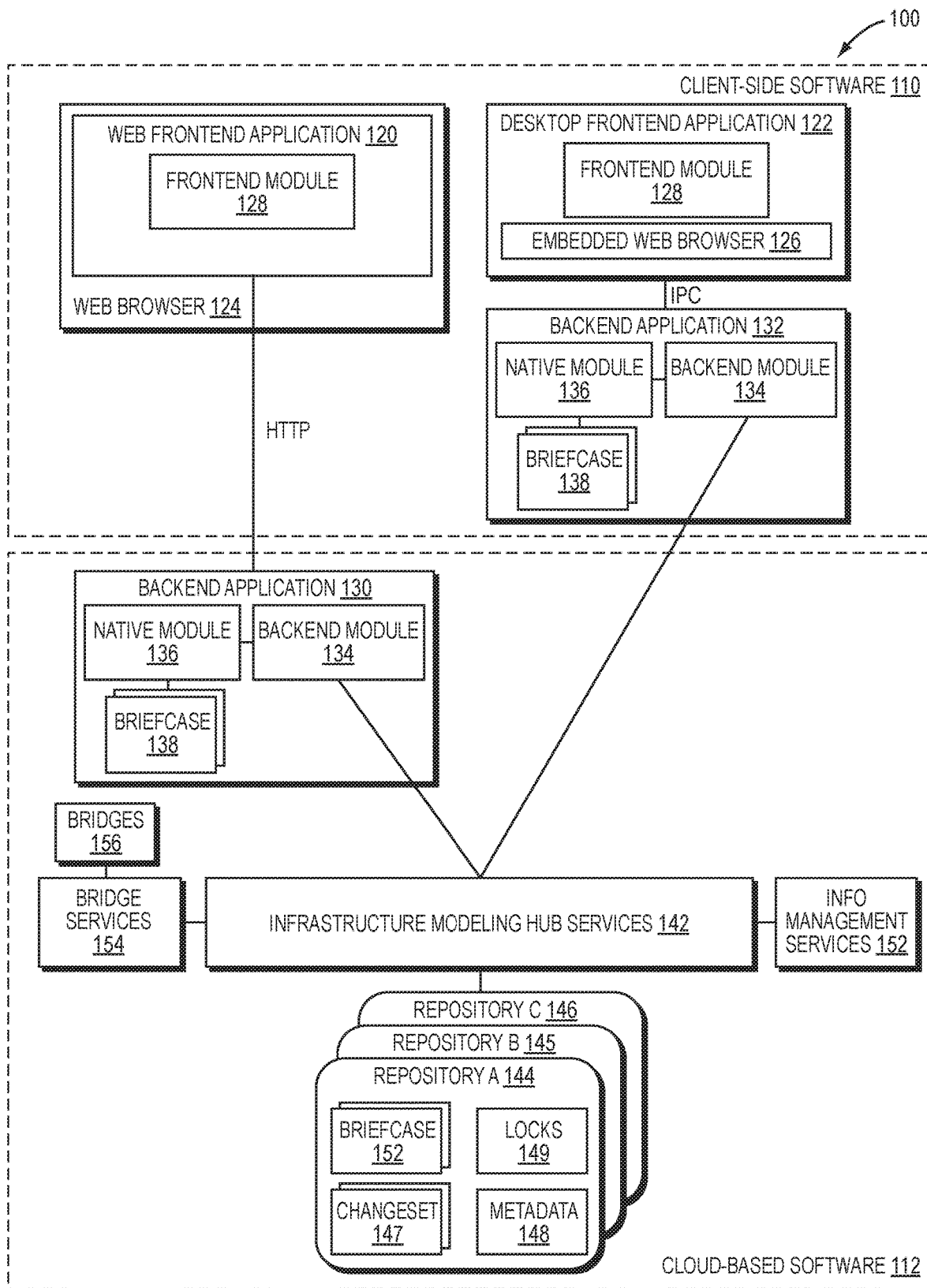
FIG. 1 is a high-level block diagram of an example infrastructure modeling software architecture.

FIG. 1 is a high-level block diagram of an example infrastructure modeling software architecture 100. The architecture may be divided into client-side software 110 that executes on one or more computing devices provided local to an end-user (collectively "client devices") and a cloud-based software 112 that is executed on one or more computing devices provided remote from the end-user (collectively "cloud computing devices"), accessible via a network (e.g., the Internet). The client-side software 110 may include web frontend applications 120 that operate within a virtual environment (e.g., a "browser sandbox") provided by a web browser 124 (e.g., the Chrome® web browser), and desktop front-end applications 122 that operate directly under an operating system, and backend applications 132 that interact therewith. The cloud-based software 112 may include infrastructure modeling hub services (e.g., iModelHub™ services) 142, other services software 152, 154 and backend applications 130 that interact with the web front-end applications 120.

The core of the cloud-based software 112 may be infrastructure modeling hub services (e.g., iModelHub™ services) 142 that provide centralized management and synchronization support to an infrastructure model (e.g., an iModel® model) that serves as a "digital twin" of physical infrastructure. As used herein, the term "infrastructure" refers to a physical structure or object that has been built, or is planned to be built, in the real-world. Examples of infrastructure include buildings, factories, roads, railways, pipe networks, etc. The infrastructure model (e.g., an iModel® model) may be a 2D or 3D "digital twin" of such buildings, factories, roads, railways, pipe networks, etc.

Infrastructure modeling hub services (e.g., iModelHub™ services) 142 maintains an infrastructure model (e.g., an iModel® model) in repositories 144-146 that include briefcases 152, a set of accepted changesets 147, metadata 148 (e.g., that includes storage locations, lookup identifiers, sequence information, etc. about the changesets), and locks 149. As used herein, the term "repository" refers to a distributed database. As used herein, the term "briefcase" refers to a particular instance of a database (e.g., a SQLite database). A briefcase may be used as a constituent database of a repository. As used herein, the term "changeset" refers to a persistent record that captures changes needed to transform a particular briefcase from one valid state to a new valid state.

A briefcase 152 in a repository 144-146 may begin as an empty "baseline" briefcase that is programmatically generated and persisted by infrastructure modeling hub services (e.g., iModelHub™ services) 142. A repository 144-146 may be modified by accepting new changesets into the set of accepted changesets 147. As the number of changesets in the set of accepted changesets 147 grows, the time required to take an empty "baseline" briefcase and apply all changesets needed to transform it into a briefcase at a specific version (e.g., the "most recent version") may grow large. For this reason, infrastructure modeling hub services (e.g., iModelHub™ services) 142 may create additional "snapshot" briefcases 152 at different versions. When a specific version (e.g., the "most recent version") of a briefcase is needed, the briefcase 152 closest to such version (which may be a "snapshot" briefcase) is accessed and changesets (or reverse changesets) from the set 147 are applied until a briefcase of the needed version is obtained.

The infrastructure model (e.g., an iModel® model) maintained in the briefcases 152 of the repositories 144-146 may be defined utilizing a conceptual schema (e.g., Built Infrastructure Schema (BIS)) and stored using an underlying database schema (e.g., DgnDb). The conceptual schema defines semantics, data structures and concepts used for modeling infrastructure. Physical information may serve as a "backbone" of the "digital twin", and non-physical information (e.g., analytical information, functional information, informational information etc.) may be maintained relative to (e.g., augmenting) the "backbone." Elements, models, element aspects and relationships may serve as building blocks of the conceptual schema. In this context, the finest-grained record that can be individually identified and locked is the element, which represents (i.e. models, in a colloquial sense of the term) an entity in the real-world. A set of closely-related elements may represent a complete object. One element may be the "lead" element, based on the nature of the object being modeled. Other elements typically relate back the lead element. When elements are using the underlying database schema they may include geometry information such as a spatial location, spatial extents, and a list of geometric primitives such as curves, b-splines, cones, etc. A model is a container for a set of elements where the set of elements collectively represent (i.e. "model", in a colloquial sense of the term) an entity in the real-world. The model owns the elements that it contains and provides context for the elements. Each element is contained in a single model. Every model "models" some element (that is not contained in that model), with the exception of a repository model, that operates similar to a table of contents. Models may be arranged according to a model hierarchy to support modeling from multiple perspectives. A single repository model may serve as a root of the model hierarchy. A relationship is a connection that relates two or more elements, element aspects or models. Examples of relationships include parent-child relationships that imply ownership and peer-to-peer relationships that define groups or interconnections. In one embodiment, two types of relationships may be provided, with an abstract relationship prohibiting instantiations but permitting inheritance therefrom, and a sealed relationship prohibiting inheritance. Likewise, an element aspect describes a set of properties that belong to a particular element, but that may have an independent lifecycle (e.g., may come and go over the lifetime of an element). An element aspect is typically not individually identifiable and lacks incoming relationships other than from the element that owns it.

The infrastructure modeling hub services (e.g., iModelHub™ services) 142 may interact with a number of other services in the cloud, that perform information management and support functions. For example, information management services 152 may manage asset data, project data, reality data, Internet of Things (IoT) data, codes, and other features. Further, bridge services 154 may work together with infrastructure modeling hub services (e.g., iModelHub™ services) 142 to permit interoperation with legacy data sources (not show), incrementally aligning data using source-format-specific bridges 156 that know how to read and interpret source data of legacy formats. A wide variety of additional services (not shown) may also be provided and interact with infrastructure modeling hub services (e.g., iModelHub™ services) 142.

In order to permit access to the infrastructure models (e.g., iModel® models) maintained in the briefcases 152 of the repositories 144-146, backend applications 130, 132 may be provided. As mentioned above, some backend applications 130 may be located in the cloud as part of cloud-based software 112, while others may be located on a client device as part of client-side software 110. The backend applications 130, 132 may maintain local copies of briefcases 138 and changesets needed to transform them into briefcases of a desired version of a repository 144-146. The backend applications 130, 132 may subscribe to notification functions provided by infrastructure modeling hub services (e.g., iModelHub™ services) 142 to receive notifications regarding new changesets in a repository's set of accepted changesets 147. The backend applications 130, 132 may then "pull" (download) the new changeset(s) and apply them to their briefcases 138 to update them to the new version. Similar operations may occur when backend applications 130, 132 modify briefcases 138, to propagate changes.

A backend application 130, 132 may include functionality for servicing requests from frontend applications 120, 122, including requests for initial metadata used to calculate a HLOD sub-tree, and requests for tiles including metadata used to grow the HLOD sub-tree. Such functionality may be implemented by an infrastructure modeling backend module (e.g., iModel.js Backend module) 134. The infrastructure modeling backend module (e.g., iModel.js Backend module) 134 may rely upon an infrastructure modeling native module (e.g., an iModel.js Native module) 136 to perform a number of different operations that require access to briefcases 138.

The frontend applications 120, 122 are concerned mainly with providing a user interface for displaying and enabling user interaction with an infrastructure model (e.g., an iModel® model). Some frontend applications may be web frontend applications 120 that operate within a virtual environment (e.g., a "browser sandbox") provided by a web browser (e.g., the Chrome® web browser) 124 on a client device, while other frontend applications may be desktop front-end applications 122 that execute as stand-alone applications, interacting directly with an operating system of a client device. Desktop front-end applications 122 may include embedded web browser code (e.g., Chromium® code) 126 to permit them to interact with backend applications 132 in a similar manner as web front-end applications 120, with a few exceptions.

Frontend applications 120, 122 may provide functionality for calculating an initial HLOD sub-tree, requesting and displaying specific tiles of the HLOD sub-tree, and determining how tiles should be refined to grow the initial HLOD sub-tree using metadata of the tiles, as well as a variety of other functionality. Such functionality may be implemented by an infrastructure modeling frontend module (e.g., iModel.js Frontend module) 128 that sends requests to the infrastructure modeling backend module (e.g., iModel.js Backend module) 134 of a backend application 130, 132. Depending upon whether the frontend application 120, 122 is a web frontend application 120 or desktop front-end application 122, the requests may be sent differently, for example, via a web protocol (e.g., HyperText Transfer Protocol (HTTP)) or via inter-process communication (IPC)).

The above described infrastructure modeling software architecture 100 may be used with techniques for frontend-driven, incremental HLOD sub-tree creation and dynamic generation of tiles. An infrastructure modeling frontend module (e.g., a iModel.js Frontend module) 128 of a frontend application 120, 122 incrementally creates a local HLOD sub-tree (e.g., an oct-tree, quad-tree, or another type of tree having nodes corresponding to tiles) based on initial metadata provided without tile contents, and refined based on metadata provided with tile contents from an infrastructure modeling backend module (e.g., a iModel.js Backend module) of a backend application 134 of the backend application 130, 132. The local HLOD sub-tree of each infrastructure modeling frontend module 128 may differ based on the individual tiles requested and/or use of different tile refinement strategies. The infrastructure modeling backend module 134 may not maintain an HLOD tree, and simply generates tiles upon request, serving them and storing them in a tile cache incase they are needed again. An algorithmically-generated content ID may be used to correlate efforts between an infrastructure modeling frontend module 128 and an infrastructure modeling backend module 134.

Because tiles are generated upon request, no unused tiles are stored, conserving processing and storage resources. Further, since tiles are generated upon, no artificial maximum LOD needs to be imposed. To further conserve storage resources, tiles may be periodically purged from the tile cache based on various criterion (e.g., least-recently-used, highest-resolution, etc.), and regenerated by the infrastructure modeling backend module 134 when next requested by an infrastructure modeling frontend module 128.

Figure 2:
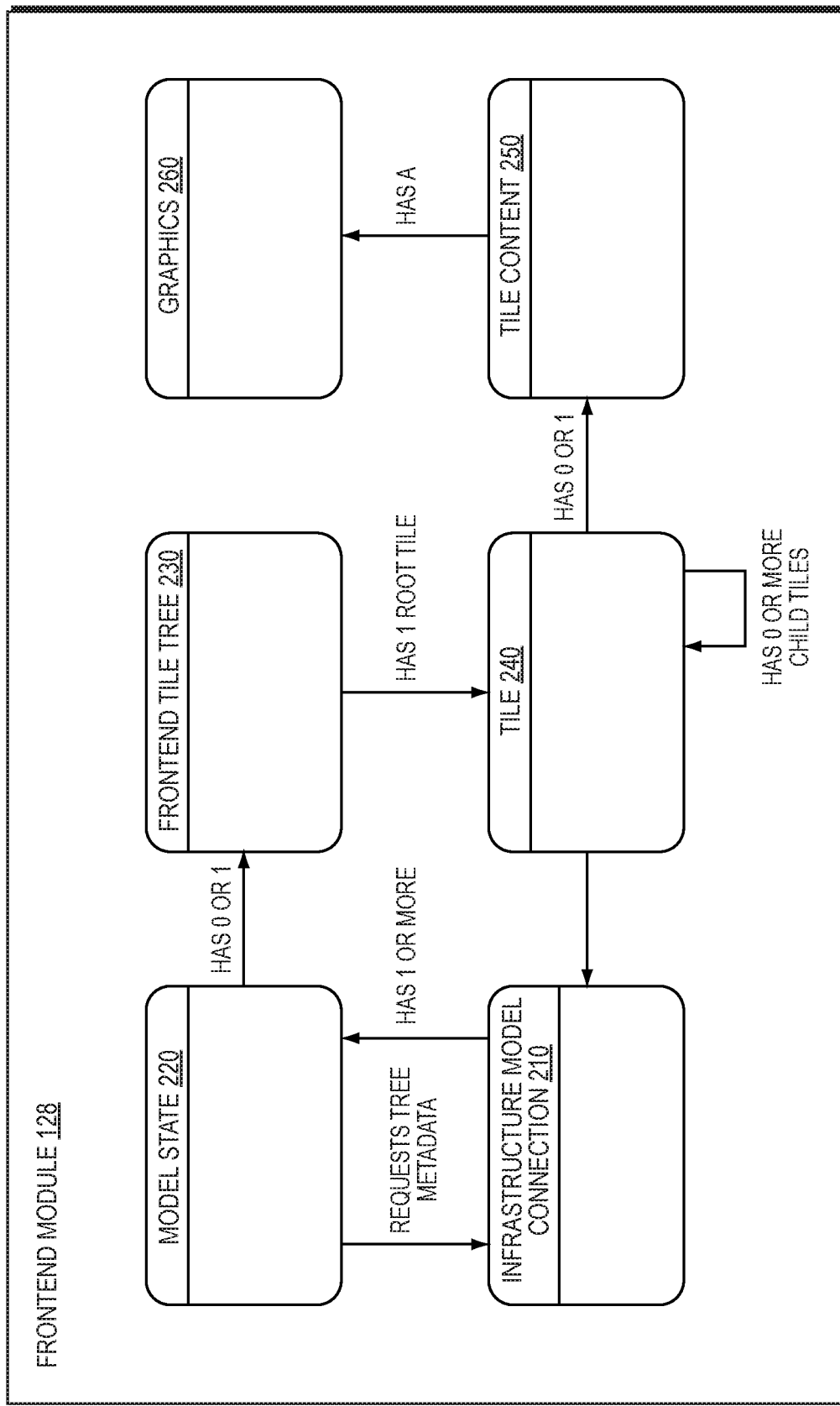
FIG. 2 is a block diagram of example software classes of an infrastructure modeling frontend module that may be executed as part of a frontend application on a client device.

FIG. 2 is a block diagram of example software classes of an infrastructure modeling frontend module (e.g., iModel.js Frontend module) 128 that may be executed as part of a frontend application 120, 122 on a client device. An infrastructure model connection object 210 may include an application program interfaces (API) for making a connection with a briefcase 138 managed by an infrastructure modeling backend module 134 and requesting information therefrom. An infrastructure model connection object 210 may have one or more model state objects 220 that maintain a front-end representation of the infrastructure model, and contain APIs for obtaining graphics for rendering its contents on a display screen of the client device. Each model state object 220 may have zero or one frontend tile tree objects 230 that operate as a container for a local HLOD sub-tree.

The frontend tile tree objects 230 may provide an API for obtaining graphics objects for the portion of the infrastructure model that is to be rendered on the display screen of the client device. This may involve determining which tiles intersect at a desired LOD, generating nodes on the HLOD sub-tree as needed, and requesting contents of those tiles from the infrastructure modeling backend module 134, if not already available locally. To this purpose, a frontend tile tree object 230 may maintain location information, a space (e.g., volume) of the HLOD sub-tree, and a tile screen size (e.g., as a number of pixels).

A tile object 240 may represent a node in the local HLOD sub-tree. A tile object 240 may have zero or one tile contents objects 250 that have graphics objects 260 that can be submitted to a rendering system on the client device to draw tile contents on the display screen. It may have no tile content objects 250 until tile contents are requested from the infrastructure modeling backend module 134, which generally occurs the first time the tile needs to be rendered. A tile object 240 may maintain a tile volume. Further, a tile object 240 may maintain a content status indicating availability of contents of the tile. For example, a content status of "not loaded" may indicate no request has yet been made for contents of the tile, a content status of "enqueued" may indicate a request has been made but a response is still being awaited, a content status of "loading" may indicate a response has been received and is being processed, and a content status of "ready" may indicate contents of the tile have been received and stored in a tile content object 250 to be rendered. Further, the tile object 240 may maintain an indication of a refinement strategy that determines when and how to refine the tile.

Figure 3:
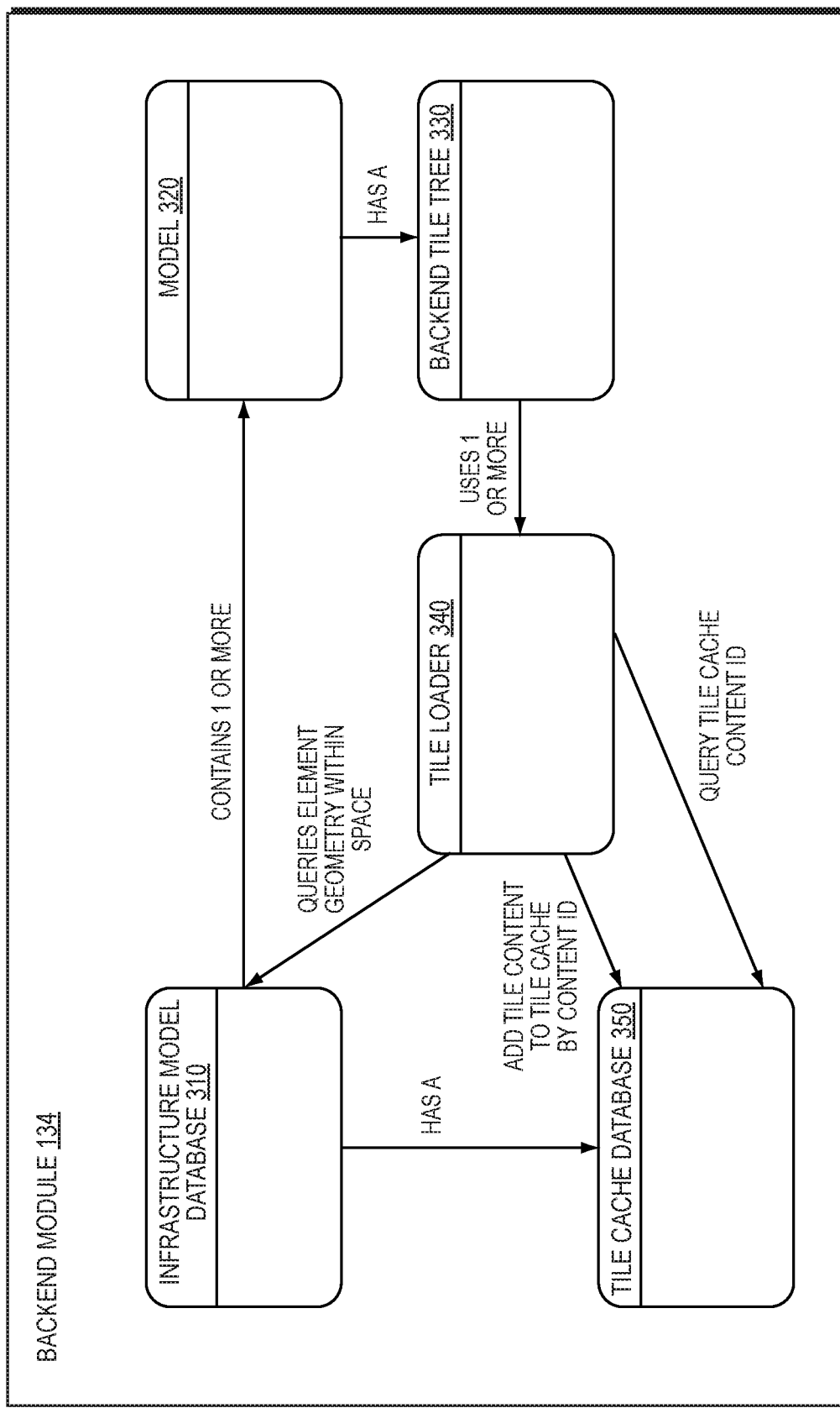
FIG. 3 is a block diagram of example software classes of an infrastructure modeling backend module that may be executed as part of a backend application on a client device or a cloud computing device.

FIG. 3 is a block diagram of example software classes of an infrastructure modeling backend module (e.g., iModel.js Backend module) 134 that may be executed as part of a backend application 130, 132 on a client device or a cloud computing device. An infrastructure modelling database object 310 may provide access to (e.g., hold open) a briefcase 138, which contains one or more models 320. As discussed above, a model owns one or more elements, containing and providing context for them. Each model 320 may have zero or one backend tile tree objects 330 that provide an API for obtaining metadata and tile contents. To this purpose, a backend tile tree object 330 may maintain location information, and a space (e.g., volume) of the portion of the HLOD tree known to the infrastructure model backend module 134.

When contents of a tile are requested, the backend tile tree objects 330 may use one or more tile loader objects to asynchronously obtain tile contents, indexed by an algorithmically-generated content ID. The backend tile tree objects 330 may maintain a set of active tile loader objects 330, and multiple requests for the same tile content may be fulfilled by the same tile tree object 330. Each tile loader object 330 may manage the storage of contents of a tile occupying a tile space (e.g., volume), according to content ID. The tile contents may be structured as a binary array. In operation, a tile loader object 340 may determine whether tile contents are already present in a tile cache of the backend module 134 by querying a tile cache database object 350. If already present, the loader object 340 may return the tile contents along with metadata related thereto. If not already present, the tile loader object 340 may query the infrastructure modeling database object 310 to obtain geometry within the space (e.g., volume) of the tile, generate tile contents, return the tile contents and metadata related thereto, and also call the tile cache database object 350 to add the contents to the tile cache.

Figure 4A:
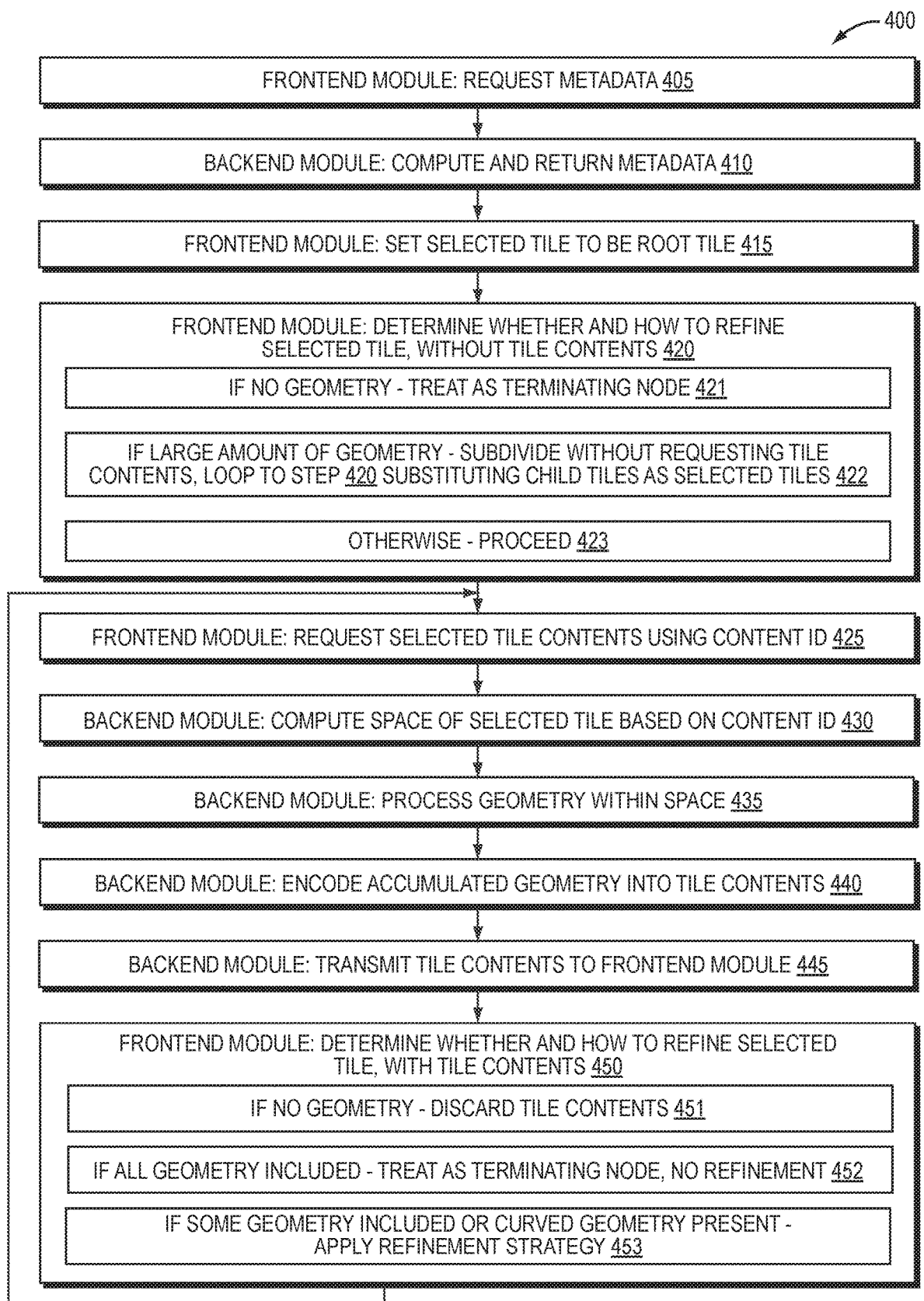
FIG. 4A is a flow diagram of an example sequence of steps for frontend-driven, incremental HLOD sub-tree creation and dynamic generation of tiles to display a view of an infrastructure model (e.g., an iModel® model)

FIG. 4A is a flow diagram of an example sequence of steps 400 for frontend-driven, incremental HLOD sub-tree creation and dynamic generation of tiles (e.g., 2D or 3D tiles) to display a view of an infrastructure model (e.g., an iModel® model). The steps 400 may be implemented by the above discussed objects of the infrastructure modeling frontend module (e.g., iModel.js Frontend module) 128 and infrastructure modeling backend module (e.g., iModel.js Backend module) 134, however the individual objects have been abstracted here to facilitate understanding of overall process flow. At step 405, the infrastructure modeling frontend module 128 on a client device requests metadata for an infrastructure model a view of which is to be displayed on a display screen. At step 410, the infrastructure modeling backend module computes and returns initial metadata, including a space (e.g., volume) occupied by the infrastructure model in the view, and a measure of an amount of geometry contained. The infrastructure modeling frontend module 128 then begins to generate a local HLOD sub-tree.

At step 415, the infrastructure modeling frontend module 128 sets a selected tile to be a root tile and a selected space (e.g., volume) to be the entire space (e.g., volume) occupied by the infrastructure model. At step 420, the infrastructure modeling frontend module 128 determines whether and how to sub-divide the selected tile, without tile contents. At sub-step 421, if the selected tile includes no geometry, the selected tile is treated as a terminating node and nothing further is done. At sub-step 422, if the selected tile includes a measure of geometry greater than a predetermined threshold (e.g. a number of elements processed indicates a "large amount" of geometry), no tile contents are requested and the selected tile is refined using a multiple child tile refinement strategy in which the tile is subdivided into multiple (e.g., 8, 4, etc.) child tiles each occupying a portion of the space (e.g., a sub-volume of the volume) of the tile, and the local HLOD sub-tree is updated to add the additional child tiles. Execution then loops back to step 420, substituting each of the newly created child tiles as the selected tile. Otherwise, at step 423, execution proceeds to where tile contents will be requested.

At step 425, the tile contents for a selected tile generated in the steps above are requested by the infrastructure modeling frontend module 128. To request the selected tile, the infrastructure modeling frontend module 128 algorithmically computes a content ID indicating the tile's position in the local HLOD sub-tree and desired LOD. The content ID serves as the mechanism by which the infrastructure modeling frontend module 128 and infrastructure modeling backend module 134 coordinate their actions, and is a unique identifier within the context of an HLOD sub-tree. Given the full space (e.g., volume) of the HLOD sub-tree, the space (e.g., volume) of the specified tile can be computed using the information contained in the content ID.

In an illustrative embodiment (assuming use of an oct-tree and the space being a volume), the content ID includes 5 parts (d, i, j, k, s) each expressed as an unsigned integer, where d is the depth of the selected tile in the HLOD sub-tree, i, j and k are coordinates identifying the volume of the tile, and d is a tile screen size (e.g., in number of pixels) indicating a LOD. In such an implementation, a single tile may be sub-divided into 8 child tiles by bisecting the tile's volume along its longest axis, bisecting the resulting two volumes along their longest axes, and bisecting the resulting four volumes along their longest access. At each step, the longest axes will be the same for every volume. Therefore, each child tile can be uniquely identified within the context of the parent tile, based on whether the "upper" or "lower" half of the volume was taken at each bisection. So, given p as the content ID of a parent tile, the IDs of each of its child tiles c can be computed on i, j, and k in [0,1], where 0 indicates the lower half of the first, second and third bisections, respectively, and 1 indicates the upper half, as follows:

$c.d=p.d+1$ $c.i=p.i*2+i$ $c.j=p.j*2+j$ $c.k=p.k*2+k$

At step 430, the infrastructure modeling backend module 134 computes the space (e.g., volume) of the selected tile based on the supplied content ID. For example, continuing the above illustrative embodiment, i, j, and k may be extracted. At step 435, the infrastructure modeling backend module 134 processes geometry within the space (e.g., volume), retaining geometry that contributes visibly at the LOD, while discarding geometry too small to contribute visibly at the LOD, to produce an accumulated geometry set. For example, continuing the above illustrative embodiment, component d is of the context ID that represents tile size may indicate the LOD. A chord tolerance is computed based on the desired size. A briefcase 138 is queried for elements that intersect the tile volume, based on the spatial locations and spatial extents included in the elements. For each element, if the element's spatial extent is too small relative to the tile size to contribute visible geometry, it is skipped. Otherwise, for each geometric primitive (e.g., curve, b-spline, cone etc.) of the element: a) any high-level primitive is converted into a low-level primitive (e.g., a mesh or polyline); b) for any meshes, additional low-level primitives are produced to represent edges of the mesh; c) any low level primitive is clipped to fit within the volume of the tile; d) position is quantized to the tile volume; and e) it is potentially combined with one or more previously-produced primitives with similar symbology. Simultaneous to such operations, metadata is accumulated. The metadata may include a measure of geometry (e.g., a number of elements processed and a number of elements skipped), an indicator of curved geometry (e.g., its presence or lack thereof), and an indicator that some geometry was excluded due to size (i.e. that there was some additional geometry available that was too small to visibly contribute).

At step 440, the accumulated geometry set and metadata is encoded (e.g., using a variant of the GL Transmission Format (gITF)) into tile contents and added to the tile cache at the infrastructure modeling backend module 134. FIG. 4B is an example format 460 for encoding tile contents. Such example format may be used with the above discusses illustrative embodiment. A header 462 includes a format ID 464, a format version 466, a volume 468 that tightly encloses the geometry within the tile (which may be tighter fitting than the tile volume), a chord tolerance 470, a number of elements processed (i.e. included elements that contained at least some geometry large enough to contribute) 472, a number of elements skipped (i.e. excluded elements containing no geometry large enough to contribute) 474, flags 476 providing an indicator of curved geometry and an indicator that some geometry was excluded due to size, and a header length 478. Also included are a feature table 480 that operates as a lookup table for a set of features within the tile contents, a scene 482 (e.g., a JSON string) that describes materials, textures, geometric primitives and the like, and data buffers 482 (e.g., binary data) that provides contiguous chunks of data referenced by pointers included in the scenes 482. The data buffers may include images as well as representations of meshes and polylines.

At step 445, the tile contents are transmitted to the infrastructure modeling frontend module 128. At step 450, the infrastructure modeling frontend module 128 determines whether and how to refine the selected tile given the desired LOD. At sub step 451, if the measure of geometry in tile-specific metadata indicates no geometry is included, the tile may be discarded. At sub step 452, if the measure of geometry in tile-specific metadata indicates all geometry was included, it is concluded that the selected tile is already at a maximal resolution, the tile is marked as a terminating node in the local HLOD sub-tree, and no refinement is performed. At sub step 453, if the measure of geometry in tile-specific metadata indicates some geometry was excluded from the tile contents, or the indicator of curved geometry indicates the presence of curved geometry, the infrastructure modeling frontend module 128 concludes that the selected tile may be displayed at a higher resolution and a tile refinement strategy may be applied. The tile refinement strategy may be a multiple-child tile refinement strategy, in which the tile is subdivided into multiple (e.g., 8, 4, etc.) child tiles each occupying a portion of the space (e.g., a sub-volume of the volume) of the tile and the local HLOD sub-tree is updated to add the multiple child tiles, similar to as in step 422 above. Alternatively, the tile refinement strategy may be a single-tile refinement strategy in which a single child tile is generated occupying the same space (e.g., volume) as the tile, but having a higher resolution than the tile (e.g., a higher number of pixels), and the local HLOD sub-tree is updated to add a single child tile. Execution may then loop back to step 425, substituting a different tile for the selected tile as needed to obtain refined tiles for the desired LOD for the view of the infrastructure model being shown on the display screen of the client device.

Figure 5:
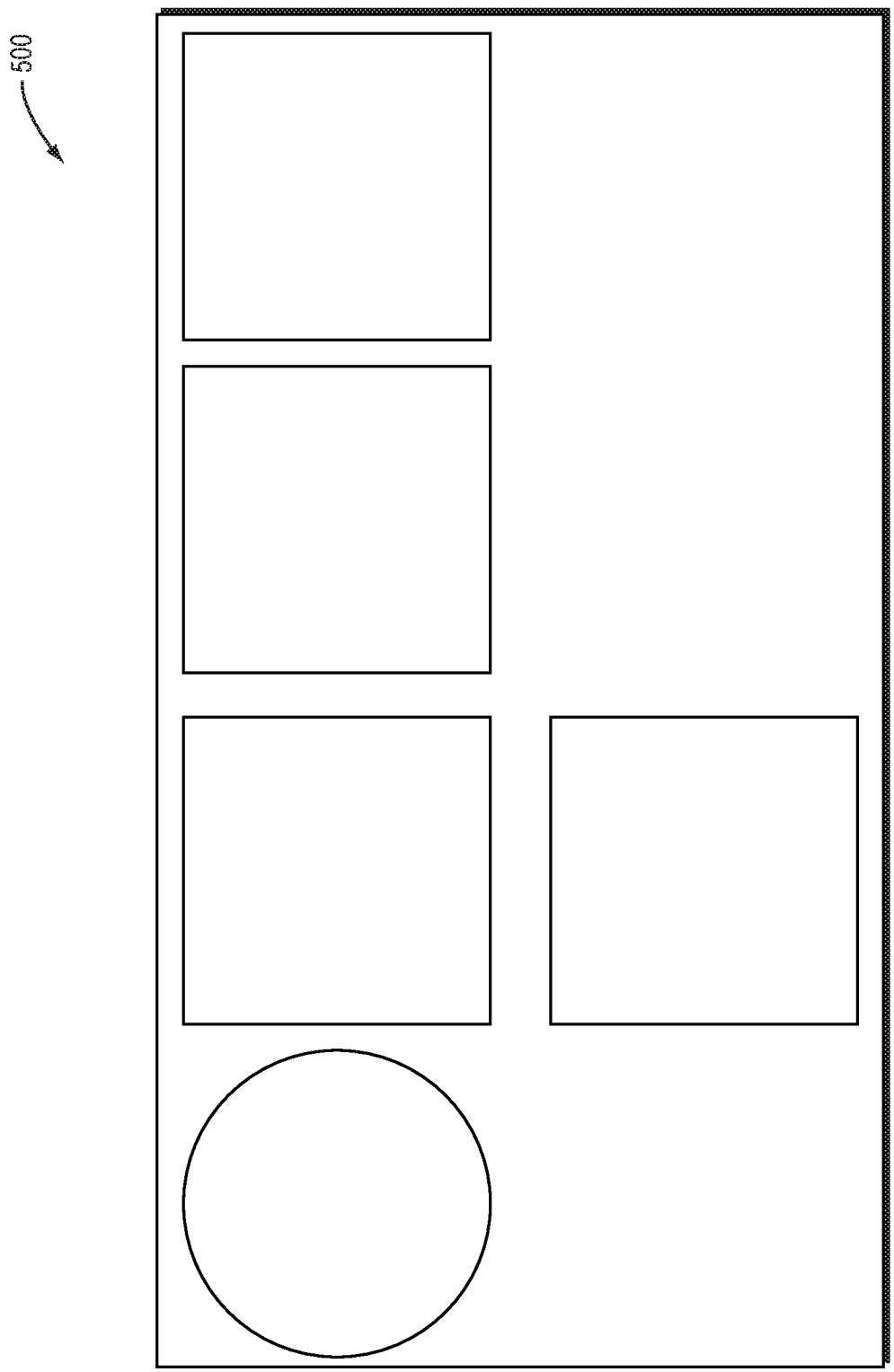
FIG. 5 is a graphical depiction of an example infrastructure model.

The above techniques may be illustrated by reference to an illustrate example, as shown in FIGS. 5-11. FIG. 5 is a graphical depiction of an example infrastructure model 500, including elements having curved geometry such as a circle, and elements without curved geometry, such as squares. It should be understood that a typical infrastructure model will generally have a far greater level of complexity, and the simple shapes included here are merely for purposes of illustration. Further, while this infrastructure model 500 is shown in 2D, it should be understood that infrastructure models often will be three-dimensional.

Figure 6:
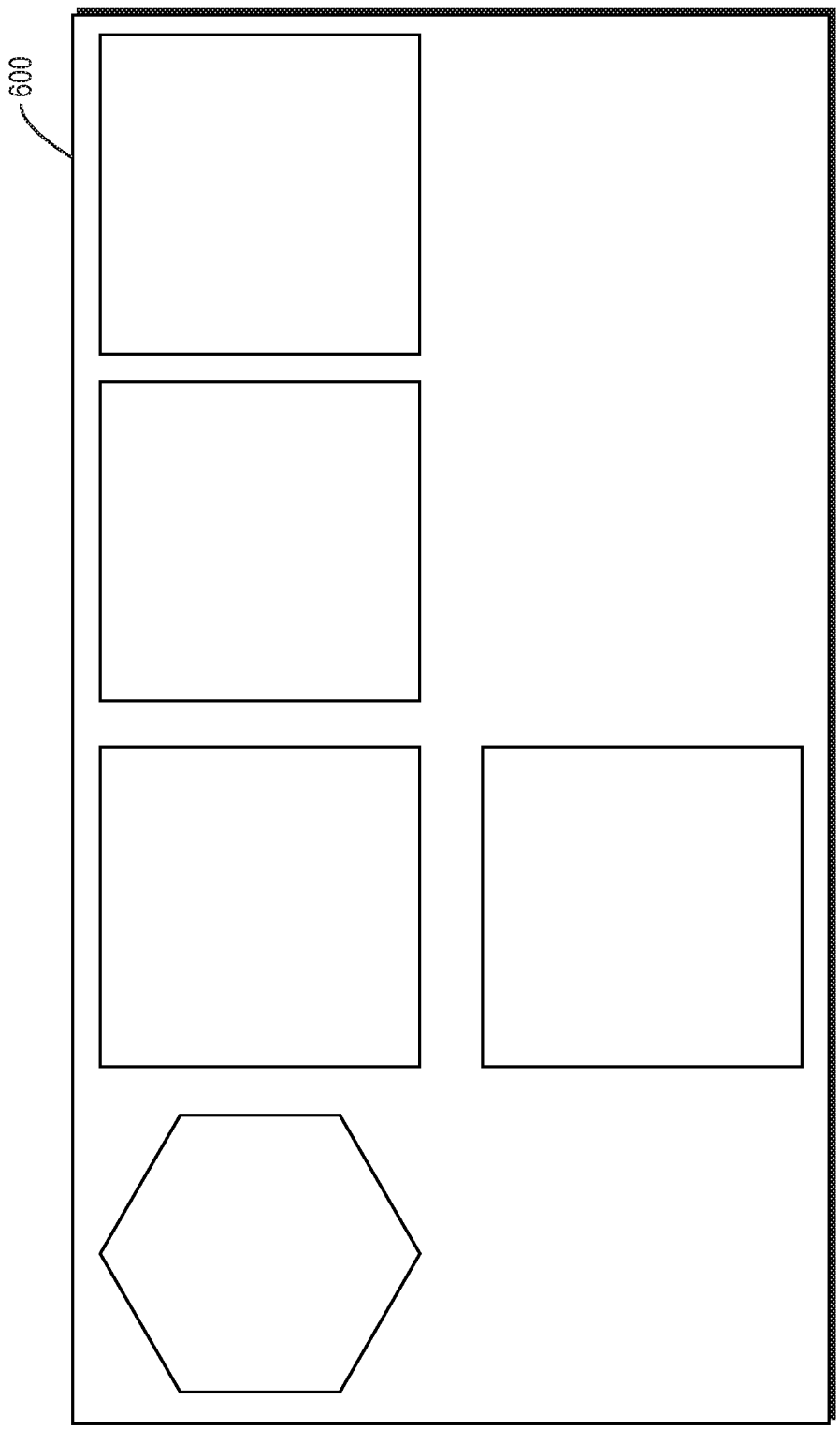
FIG. 6 is a graphical depiction of an example root tile for a view of the entire infrastructure model of FIG. 5.

FIG. 6 is a graphical depiction of an example root tile 600 for a view of the entire infrastructure model 500 of FIG. 5. The root tile may be selected as part of step 415 of FIG. 4A above. As can be seen, at a LOD of the root tile, the curved geometry of the circle may appear "blocky", here with 6 linear facets.

Figure 7:
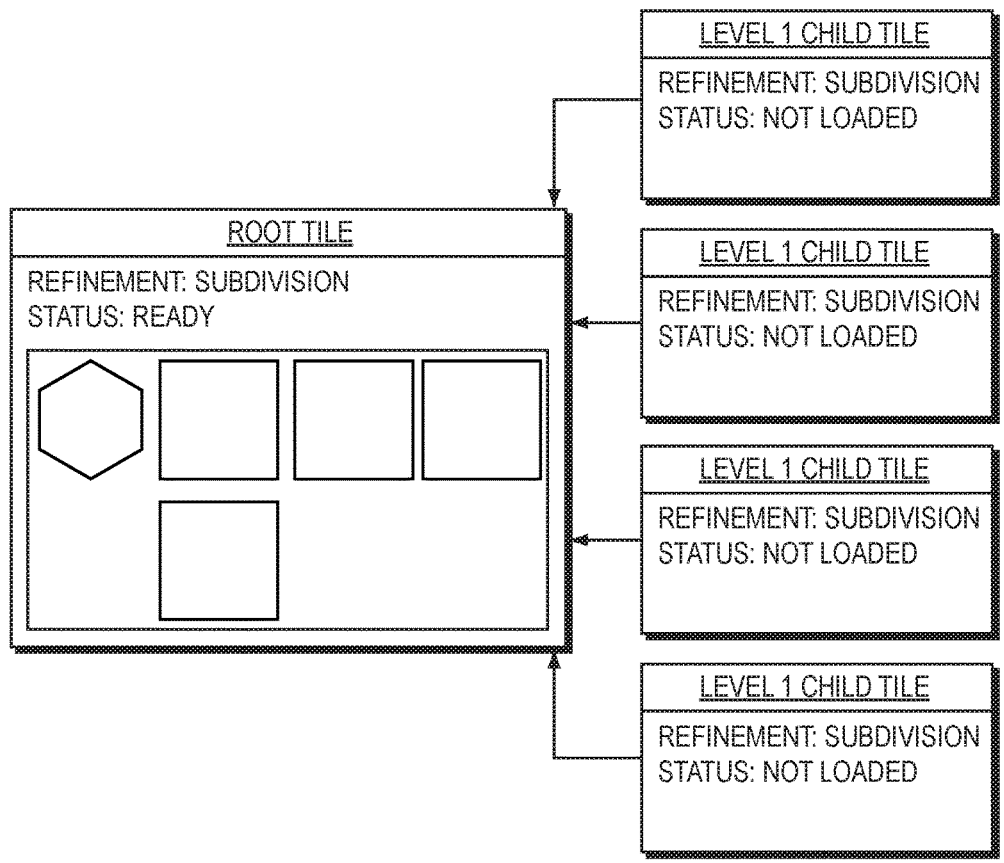
FIG. 7 is a diagram illustrating initial states of an example local HLOD sub-tree generated by an infrastructure modeling frontend module.

FIG. 7 is a diagram illustrating initial states of an example local HLOD sub-tree generated by the infrastructure modeling frontend module (e.g., iModel.js Frontend module) 128. A first local HLOD sub-tree 710 represents an initial state, with the root tile 600 from FIG. 6 not yet loaded. A second local HLOD sub-tree 720 represents a later state, after the infrastructure modeling frontend module 128 has load the root tile 600 and sub-divided the root tile into child tiles by applying a multiple-child tile refinement strategy, by execution of step 425-450 above with the selected tile being the root tile 500.

Figure 8:
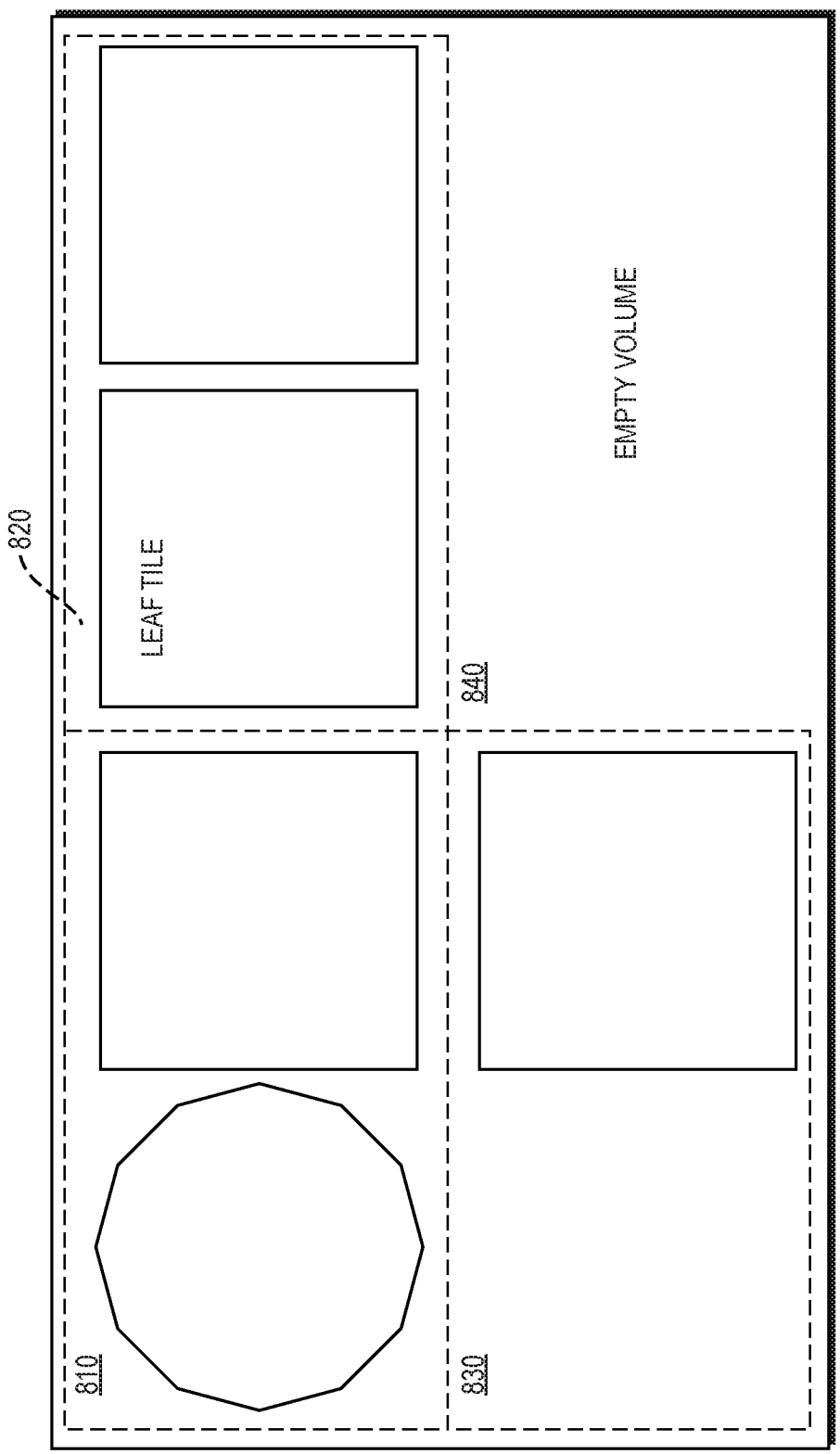
FIG. 8 is a graphical depiction of an example subdivision of a root tile into four child tiles, each occupying a portion of the space (here, a sub-area) of the root tile.

FIG. 8 is a graphical depiction of an example subdivision of the root tile 600 into four child tiles 810-840, each occupying a portion of the space (here, an area) of the root tile 600. As can be seen, at a LOD of the child tiles 810, the curved geometry of the circle may still appear "blocky", but somewhat less so than in FIG. 6 (here with 12 linear facets, rather than 6).

Figure 9A:
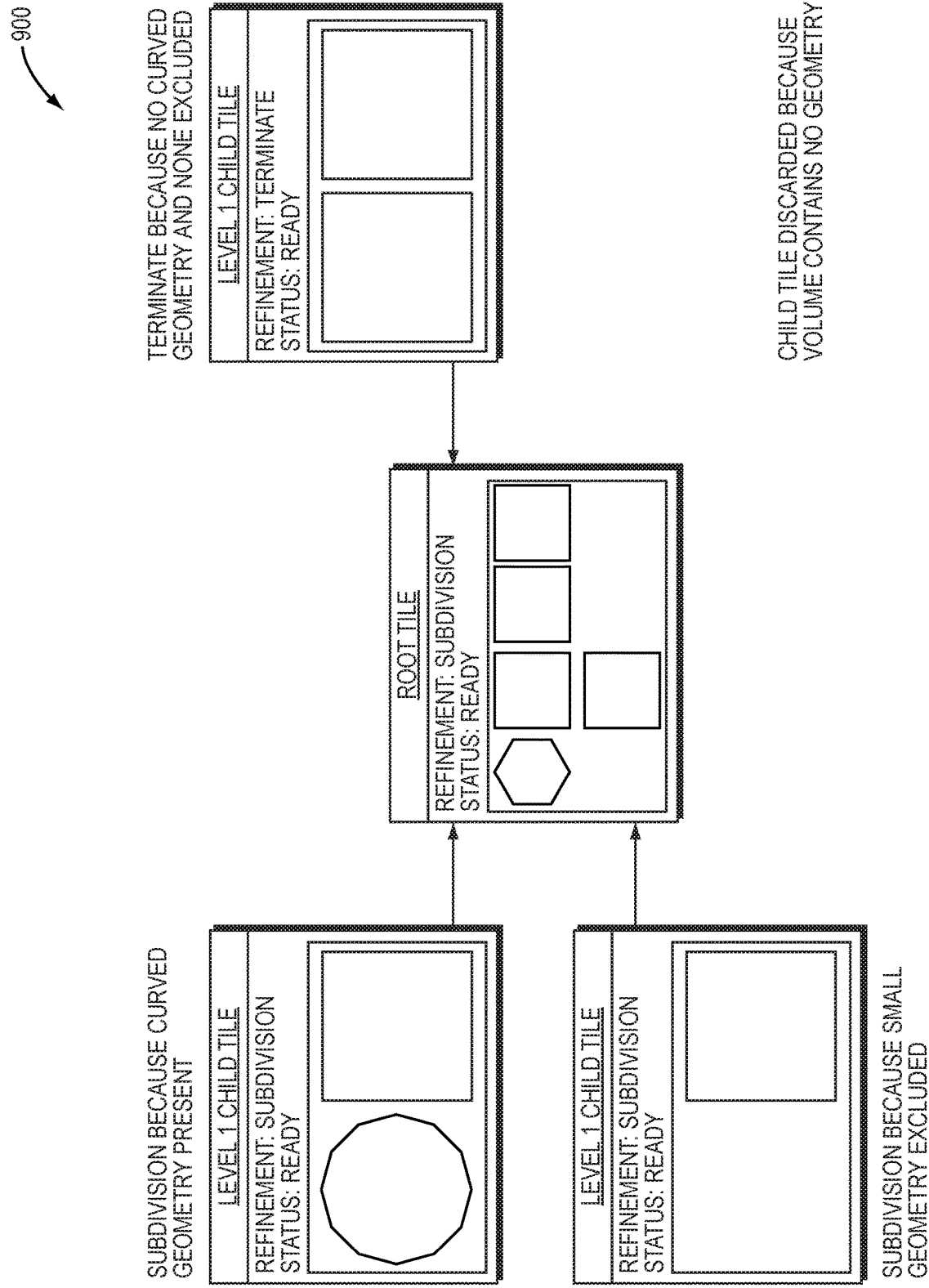
FIG. 9A is a diagram illustrating a third local HLOD sub-tree that represents an even later state, after an infrastructure modeling frontend module has loaded child tiles.

FIG. 9A is a diagram illustrating a third local HLOD sub-tree 900 that represents an even later state, after the infrastructure modeling frontend module 128 has loaded child tiles 810-840. By repeated execution of step 425-450 of FIG. 4A with the selected tile being each child tile, it may be determined that some child tiles require further refinement by application of a multiple-child tile refinement strategy due to presence of curved geometry or exclusion of some geometry, while others are marked as terminating nodes, being already at a maximal resolution, or discarded as including no geometry.

Figure 9B:
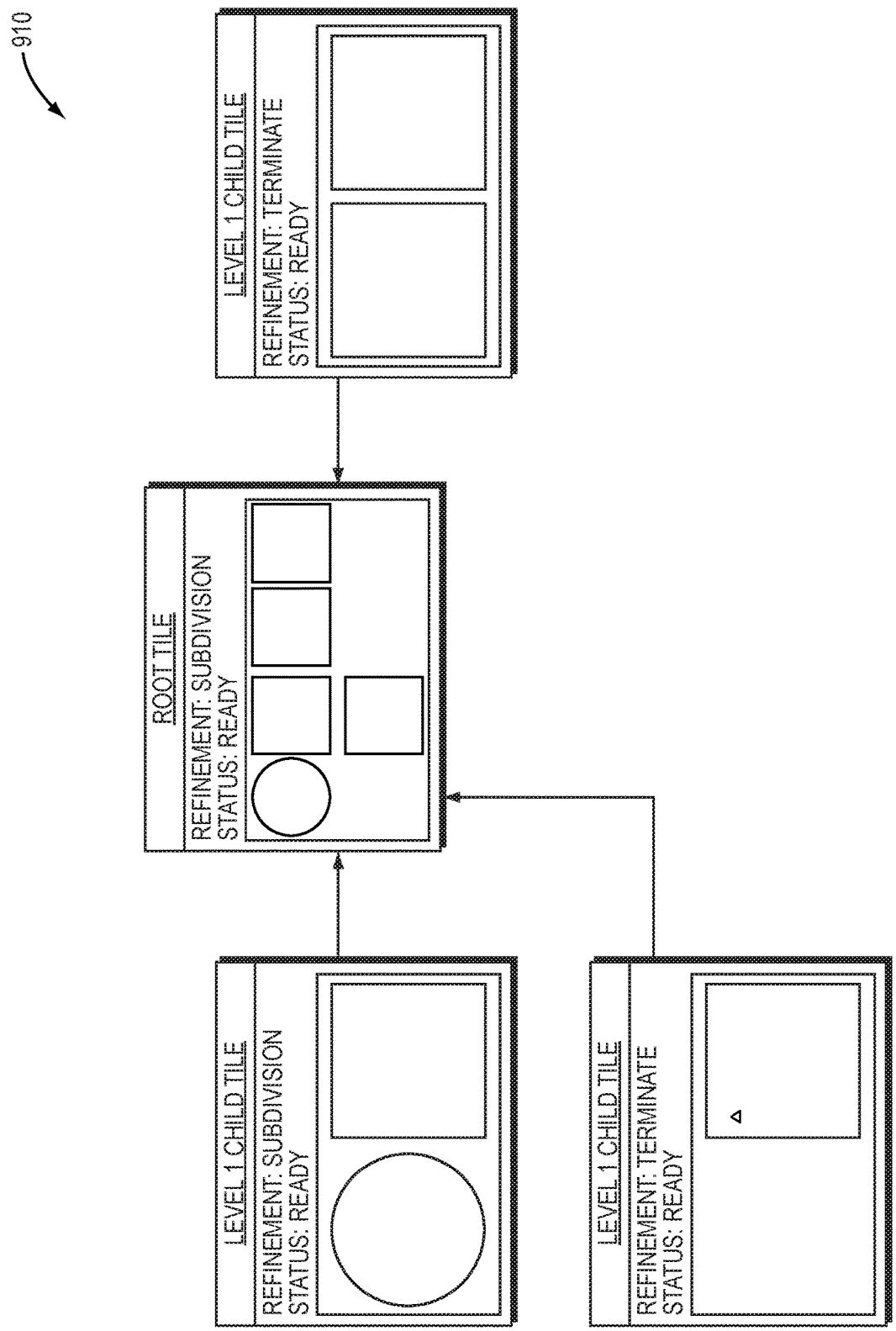
FIG. 9B is a diagram illustrating an alternative third local HLOD sub-tree that represents an alternative even later state, after the infrastructure modeling frontend module has loaded child tiles.

FIG. 9B is a diagram illustrating an alternative third local HLOD sub-tree 910 that represents an alternative even later state, after the infrastructure modeling frontend module 128 has loaded child tiles 810-840. Such an alternative third local HLOD sub-tree 910 may be reached by an infrastructure modeling frontend module 128 of a different frontend application than in FIG. 9A. For example, by choosing a larger tile screen size, resulting in higher resolution tiles, some tiles that contain no curved geometry may already be at a maximal resolution, and be marked as terminating nodes rather than designated for further refinement. Accordingly, the HLOD sub-tree 910 may differ from the HLOD sub-tree 900.

Figure 10:
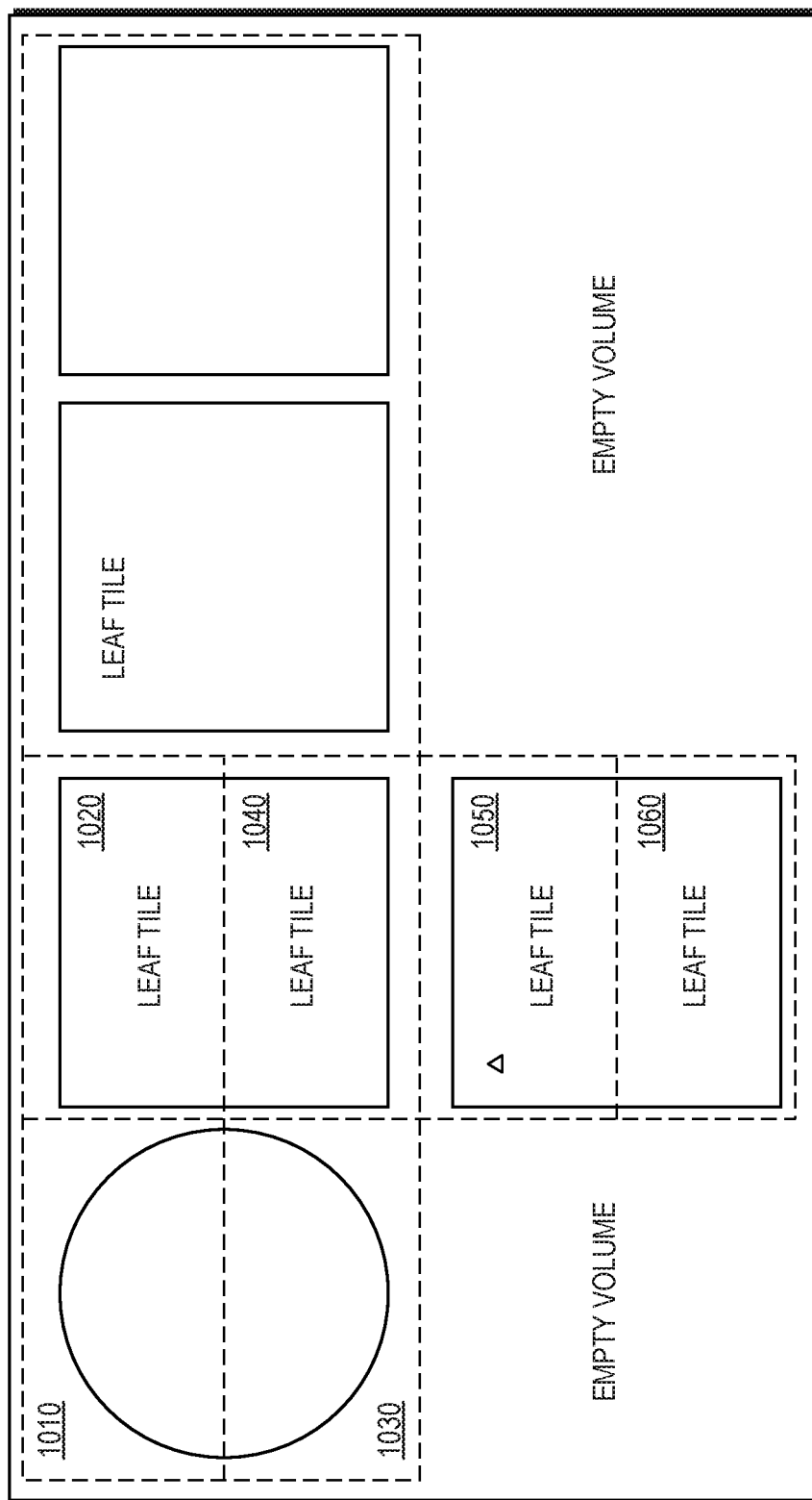
FIG. 10 is a graphical depiction of an example subdivision of at least some child tiles into second level child tiles.

FIG. 10 is a graphical depiction of an example subdivision of at least some of the child tiles 810, 830 (now referred to as first-level child tiles) into second-level child tiles 1010-1060, each occupying a portion of the space (here, a sub-area) of the respective first-level child tile. As can be seen, at a LOD of the second-level child tiles 1010, 1030, the curved geometry of the circle begins to appear smooth.

Figure 11:
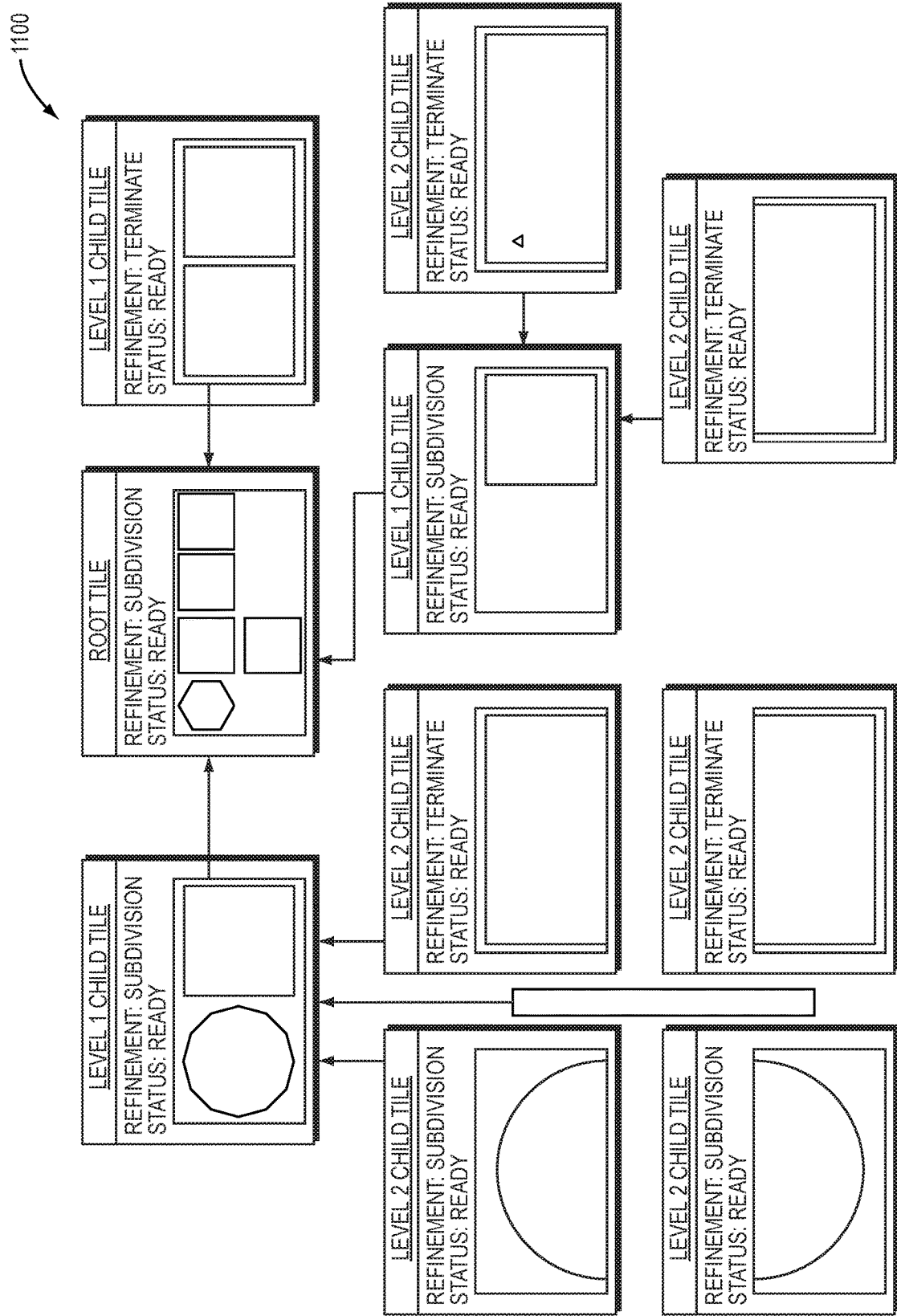
FIG. 11 is a diagram illustrating a fourth local HLOD sub-tree representing a still later state, after an infrastructure modeling frontend module has loaded second-level child tiles.

FIG. 11 is a diagram illustrating a fourth local HLOD sub-tree 1100 representing a still later state, after the infrastructure modeling frontend module 128 has loaded second-level child tiles 1010-1060. By again repeated execution of steps 425-450 of FIG. 4A with the selected tile being each second-level child tile, further refinements may be determined.

Figure 12:
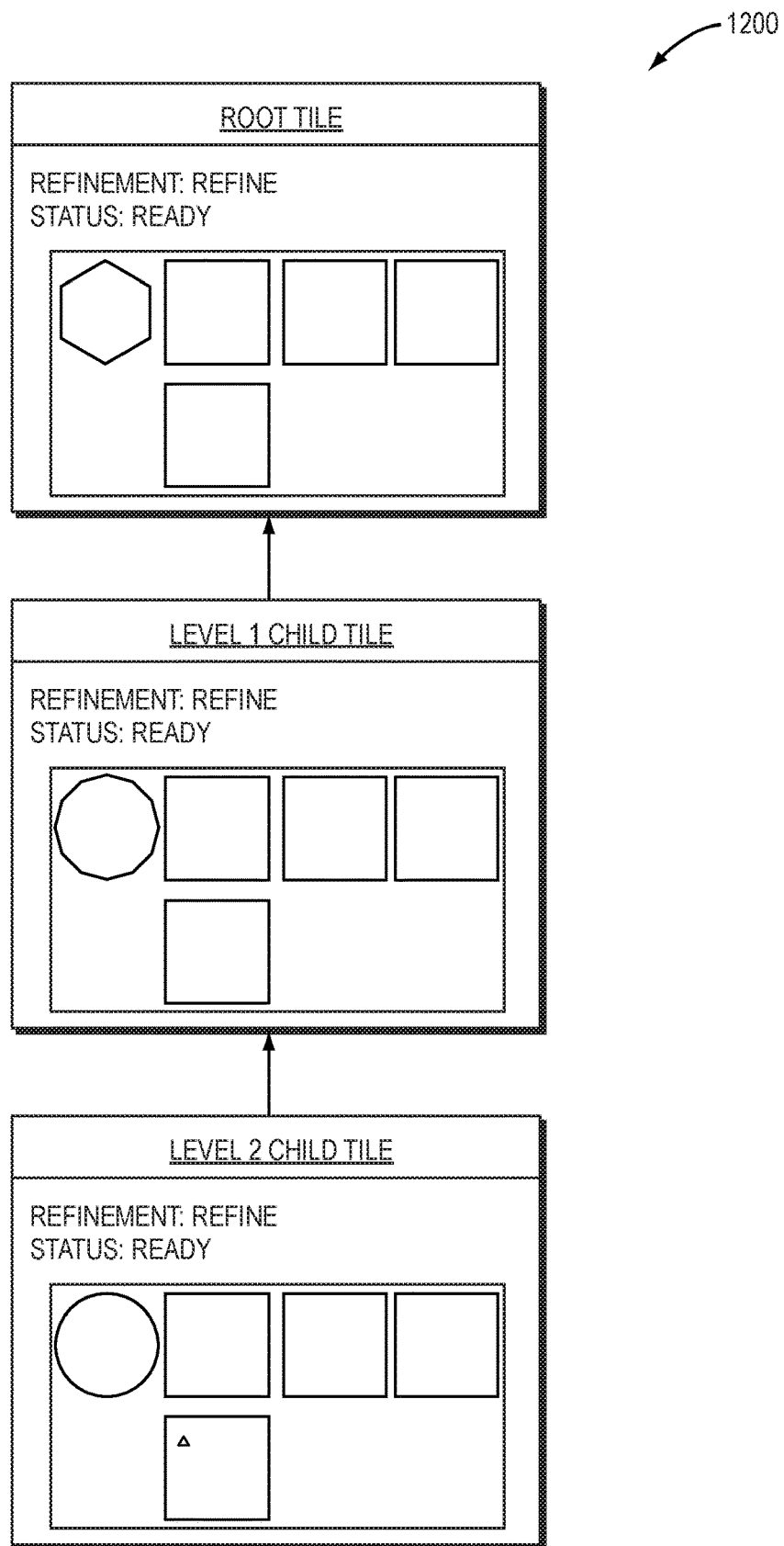
FIG. 12 is a local HLOD sub-tree illustrating application of a single-tile refinement strategy.

The illustrative example of FIGS. 5-11 utilizes a multiple-child tile refinement strategy for each refinement. It should be understood that the strategy may be replaced for some (or all) of the refinements by a single-tile refinement strategy that, for a given parent tile, generates a single child tile occupying the same space (e.g., volume) as the parent tile, but has a higher resolution than the parent tile (e.g., a higher number of pixels). FIG. 12 is a local HLOD sub-tree 1200 illustrating application of a single-tile refinement strategy. Such HLOD sub-tree 1200 may have been generated by repeated execution of step 425-450 to the example root tile 600 of FIG. 6, applying a single-tile refinement strategy at each level. As can be seen, the HLOD sub-tree 1200 is linear, with each node representing a tile that occupies the same space (here, area) as the root tile but having a higher resolution, such that curved geometry of the circle may appears less blocky (i.e. less faceted) as one progresses to lower-level child tiles.

In summary, techniques are described above for frontend-driven, incremental HLOD sub-tree creation and dynamic generation of tiles. It should be understood that a wide variety of adaptations and modifications may be made to the techniques. Further, in general, functionality may be implemented in software, hardware or various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

What is claimed is:

1. A method comprising:
    receiving, by a frontend module executing on a local computing device, a request to display a view of a model;
    incrementally building a hierarchical level of detail (HLOD) sub-tree that supports the view, by the frontend module, the incremental building performed without using any HLOD tree or portion thereof from a backend module executing on a remote computing device, the incrementally building to include at least:
        selecting one or more tiles of an initial HLOD sub-tree, each selected tile having a resolution,
        requesting information from the backend module that includes metadata describing geometry of the selected tile,
        determining whether each selected tile requires refinement based on metadata describing geometry of the selected tile, and
        in response to each selected tile that requires refinement, applying a refinement strategy to the selected tile to generate one or more child tiles for the selected tile that have a higher resolution than the selected tile to create the incrementally-built HLOD sub-tree; and
    displaying, by the frontend module, the view of the model by showing one or more tiles of the incrementally-built HLOD sub-tree on a display screen.

2. The method of claim 1, wherein the backend module does not maintain any HLOD trees.

3. The method of claim 1, wherein the information comprises tile contents, and the refinement is refinement based on tile contents.

4. The method of claim 3, wherein the incrementally building further includes:
    calculating the initial HLOD sub-tree without tile contents.

5. The method of claim 4, wherein the incrementally building further includes:
    requesting metadata describing geometry without requesting tile contents,
    selecting one or more initial tiles of the initial HLOD sub-tree,
    determining whether each selected initial tile requires refinement based on the metadata describing geometry, and
    in response to each selected initial tile that requires refinement without tile contents, applying a refinement strategy to the selected initial tile to generate one or more child tiles for the selected initial tile that have a higher resolution than the selected tile, to build the initial HLOD sub-tree.

6. The method of claim 5, wherein the determining whether each selected initial tile requires refinement without tile contents determines the selected initial tile requires refinement based on the measure of geometry exceeding a predetermined threshold.

7. The method of claim 5, wherein the building further comprises:
in response to each selected initial tile that includes no geometry, treating the selected initial tile includes no geometry as a terminating node in the HLOD sub-tree.

8. The method of claim 5, wherein the building further comprises:
in response to each selected initial tile that does not require refinement without tile contents and includes at least some geometry, proceeding to request tile contents for the selected initial tile that does not require refinement without tile contents.

9. The method of claim 3, wherein the tile contents includes a geometry set with geometry that contributes visibly at the resolution of the selected tile and the metadata describing geometry includes at least one of a measure of geometry, an indicator of curved geometry or an indicator of geometry exclusion due to size.

10. The method of claim 9, wherein the determining the selected tile requires refinement with tile contents determines the selected tile requires refinement based on the measure of geometry or the indicator of exclusion showing that geometry was excluded from the tile contents or the indicator of curved geometry indicating presence of curved geometry.

11. The method of claim 3, wherein the incrementally building further includes:
in response to each selected tile that does not require refinement with tile contents, treating the selected tile that does not require refinement with tile content as a terminating node in the HLOD sub-tree.

12. The method of claim 3, wherein the incrementally building further includes:
in response to each selected tile that includes no geometry, discarding tile contents of the selected tile that includes no geometry.

13. The method of claim 3, further comprising:
computing, by the backend module, a space of each selected tile;
processing, by the backend module, geometry within the space of each selected tile;
encoding, by the backend module, the geometry into tile contents;
transmitting the tile contents to the frontend module.

14. The method of claim 1, wherein the model is an infrastructure model that models a physical structure or object that has been built, or is planned to be built, in the real-world.

15. A method comprising:
receiving a request, by a frontend module executing on a local computing device, to display a view of a model on a display screen;
in response to the request, incrementally building, by the frontend module, a hierarchical level of detail (HLOD) sub-tree, the incrementally building to request metadata describing geometry of one or more tiles from a backend module executing on a remote computing device, and based on the metadata provided by the backend module add one or more tiles to an initial sub-HLOD tree to support the view of the model, wherein the backend module does not provide any HLOD tree or portion thereof to the frontend module; and
displaying, by the frontend module, the view of the model by showing the one or more tiles of the incrementally-built HLOD sub-tree on the display screen.

16. The method of claim 15, wherein the incrementally-built HLOD sub-tree built by the frontend module differs from one or more other incrementally-built HLOD sub-trees built by other frontend modules.

17. The method of claim 15, wherein the initial HLOD sub-tree is calculated without tile contents and the addition of one or more tiles is performed based upon tile contents.

18. A non-transitory electronic device readable medium having instructions stored thereon, the instructions when executed by one or more processors of one or more computing devices configured to:
receive a request to display a view of a model;
incrementally build a hierarchical level of detail (HLOD) sub-tree that supports the view by a particular frontend module, the HLOD sub-tree specific to the particular frontend module and differing from a HLOD sub-tree of one or more other frontend modules, the incremental build performed without using any HLOD tree or portion thereof from a backend module, the incrementally build to at least:
select one or more tiles of an initial HLOD sub-tree, each selected tile having a resolution,
determine whether each selected tile requires refinement, and
in response to each selected tile that requires refinement, apply a refinement strategy to the selected tile to generate one or more child tiles for the selected tile that have a higher resolution than the selected tile to create the incrementally-built HLOD sub-tree; and
display the view of the model by showing one or more tiles of the incrementally-built HLOD sub-tree.

* * * * *

UNITED STATES PATENT AND TRADEMARK OFFICE
CERTIFICATE OF CORRECTION

PATENT NO. : 11,100,703 B2
APPLICATION NO. : 16/599950
DATED : August 24, 2021
INVENTOR(S) : Paul Connelly et al.

It is certified that error appears in the above-identified patent and that said Letters Patent is hereby corrected as shown below:

On the Title Page

(57) ABSTRACT reads:
"ing them in a tile cache incase they are needed again."
Should read:
--ing them in a tile cache in case they are needed again.--

In the Specification

Column 1, Line 43 reads:
"structure modeling techniques. However, it has also lead to"
Should read:
--structure modeling techniques. However, it has also led to--

Column 2, Line 42 reads:
"incase they are needed again. Because tiles are generated"
Should read:
--in case they are needed again. Because tiles are generated--

Column 6, Line 38 reads:
"ing them in a tile cache incase they are needed again. An"
Should read:
--ing them in a tile cache in case they are needed again. An--

Column 9, Line 27 reads:
"component $d$ is of the context ID that represents tile size may"
Should read:
--component $d$ of the context ID that represents tile size may--

Signed and Sealed this
Twenty-fifth Day of June, 2024

Katherine Kelly Vidal
*Director of the United States Patent and Trademark Office*

CERTIFICATE OF CORRECTION (continued)
U.S. Pat. No. 11,100,703 B2

In the Claims

Claim 9
Column 13, Line 22 reads:
"includes a geometry set with geometry that contributes"
Should read:
--include a geometry set with geometry that contributes--